(12) United States Patent
Agati et al.

(10) Patent No.: US 8,820,765 B2
(45) Date of Patent: Sep. 2, 2014

(54) RIDE-ON TOY WITH ADJUSTABLE SEATBACK

(75) Inventors: Joseph Agati, Chicago, IL (US); Edward Paramadilok, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 2 days.

(21) Appl. No.: 13/540,491

(22) Filed: Jul. 2, 2012

(65) Prior Publication Data

US 2013/0056951 A1  Mar. 7, 2013

Related U.S. Application Data

(60) Provisional application No. 61/571,622, filed on Jul. 1, 2011.

(51) Int. Cl.
*B62J 1/00* (2006.01)
*B62K 9/02* (2006.01)
*B62J 1/28* (2006.01)

(52) U.S. Cl.
CPC ..... *B62J 1/28* (2013.01); *B62K 9/02* (2013.01)
USPC .................. 280/282; 297/215.14; 297/215.13

(58) Field of Classification Search
USPC ......... 280/282, 287, 278; 297/215.14, 215.13
See application file for complete search history.

(56) References Cited

U.S. PATENT DOCUMENTS

| 2,197,658 | A | | 4/1940 | Gallo |
| 2,220,528 | A | | 11/1940 | Kutil |
| 2,301,036 | A | | 11/1942 | Gray |
| 2,591,534 | A | | 4/1952 | Gallo et al. |
| 3,062,559 | A | | 11/1962 | Hewitt |
| 3,096,100 | A | | 7/1963 | Clarke et al. |
| 3,427,037 | A | | 2/1969 | Marasco |
| 4,168,846 | A | * | 9/1979 | Carren .......................... 280/278 |
| 4,272,095 | A | | 6/1981 | Ptaszek |
| 4,327,929 | A | | 5/1982 | Melzian |
| D277,947 | S | | 3/1985 | Blumenthal |
| 4,546,991 | A | * | 10/1985 | Allen et al. ................... 280/282 |
| 4,657,270 | A | * | 4/1987 | Allen et al. ................... 280/7.1 |
| D300,619 | S | | 4/1989 | Phinney et al. |
| D337,973 | S | | 8/1993 | Mariol |
| 5,765,871 | A | | 6/1998 | Wyman et al. |
| D435,235 | S | | 12/2000 | De Oliveira |
| D480,023 | S | | 9/2003 | Hsaio |
| D480,024 | S | | 9/2003 | Gunter et al. |
| D480,665 | S | | 10/2003 | Gunter et al. |
| D483,420 | S | | 12/2003 | DeLong et al. |
| D484,073 | S | | 12/2003 | Heinemann et al. |
| D485,513 | S | | 1/2004 | De Oliveira |

(Continued)

*Primary Examiner* — Joseph M Rocca
*Assistant Examiner* — Michael Stabley
(74) *Attorney, Agent, or Firm* — McDermott Will & Emery LLP

(57) ABSTRACT

A vehicle includes a seating platform featuring a first pair of seat mounting holes, a second pair of seat mounting holes positioned rearward of the first pair of seat mounting holes and a third pair of seat mounting holes positioned rearward of the second pair of seat mounting holes. A seatback is provided with a pair of hooks and a pair of snaps. Each of the snaps includes a catch portion. The hooks and snaps are adapted to engage the first and second pair of seat mounting holes to secure the seatback in a first position. The hooks and snaps are also adapted to engage the second and third pair of seat mounting holes to secure the seatback in a second position.

17 Claims, 13 Drawing Sheets

(56) References Cited

U.S. PATENT DOCUMENTS

| | | |
|---|---|---|
| D514,476 S | 2/2006 | Glenn, II |
| D524,699 S | 7/2006 | Kurth et al. |
| 7,086,657 B2 * | 8/2006 | Michelau et al. ............. 280/282 |
| D564,041 S | 3/2008 | Rodriguez et al. |
| D582,489 S | 12/2008 | Badanjo |
| D645,381 S | 9/2011 | Bricker et al. |
| D659,054 S | 5/2012 | Agati et al. |
| D659,055 S | 5/2012 | Agati et al. |
| 8,196,887 B2 * | 6/2012 | Dahlbacka et al. ............ 248/429 |
| 8,454,045 B2 * | 6/2013 | Kettler et al. ................. 280/291 |
| 8,596,649 B2 | 12/2013 | Bricker |
| 2009/0212190 A1 * | 8/2009 | Dahlbacka et al. ............ 248/429 |

\* cited by examiner

RIDE-ON TOY WITH ADJUSTABLE SEATBACK

CLAIM OF PRIORITY

This application claims priority from U.S. Provisional Patent Application Ser. No. 61/571,622, filed Jul. 1, 2011, currently pending.

FIELD OF THE INVENTION

The present invention relates to ride-on toys for children and, more particularly, to a ride-on toy featuring an adjustable seatback.

While the ride-on toy of the present invention is illustrated as a tricycle, the present invention may be incorporated into other types of ride-on toys and vehicles.

DETAILED DESCRIPTION OF EMBODIMENTS

Figure 1:
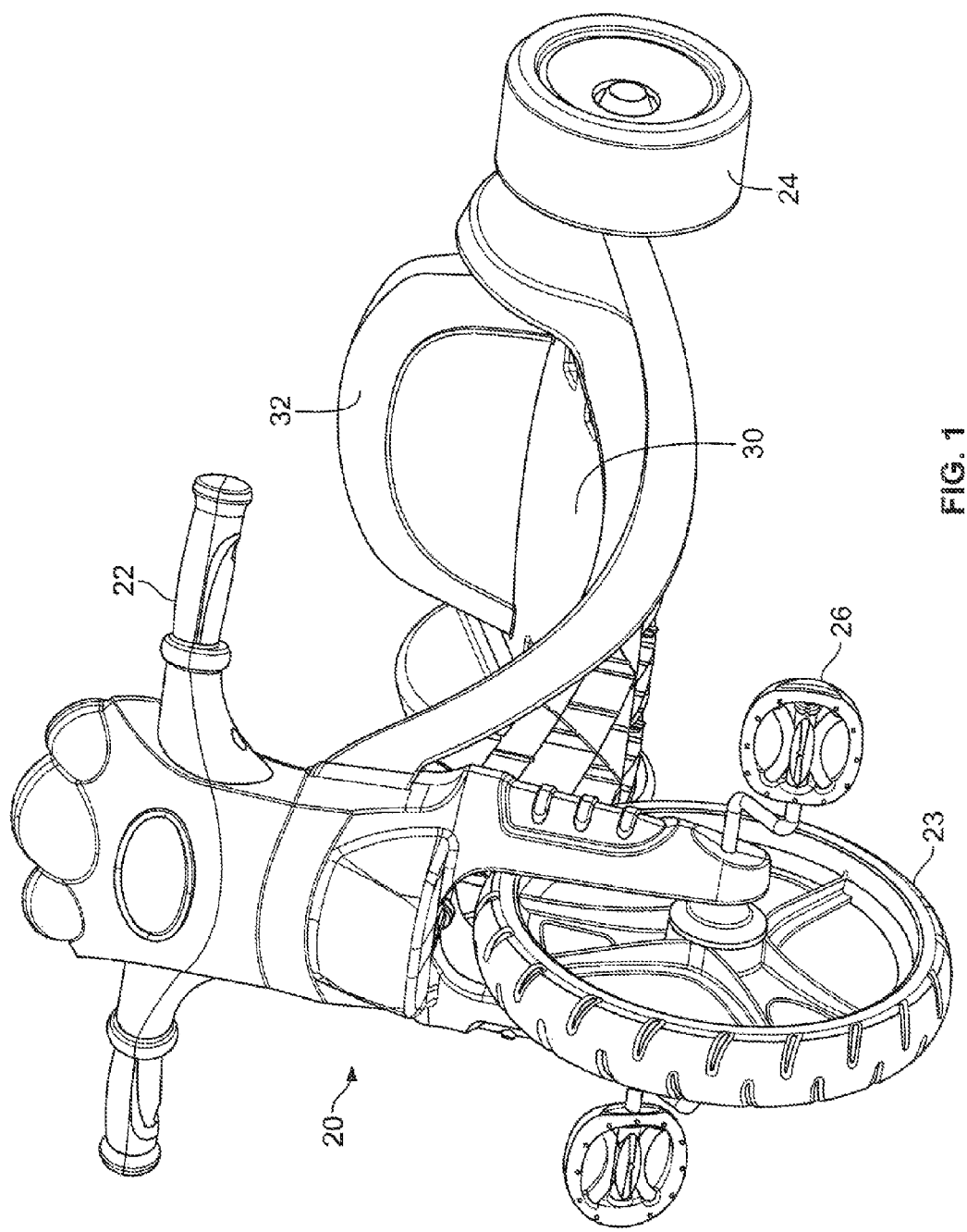
FIG. 1 is a front perspective view of a tricycle embodiment of the ride-on toy of the present invention.

An embodiment of the ride-on toy of the present invention in the form of a tricycle is indicated in general at 20 in FIG. 1. The invention may be incorporated into other types of vehicles. The tricycle features handlebars 22, a front wheel 23 and rear wheels 24. The front wheel 23 is powered by a child rider via pedals 26.

The body of the tricycle features a seating platform 30 and, in accordance with the present invention, an adjustable seatback 32. As illustrated in FIGS. 2-7, the seatback, which is preferably molded from plastic (but other constructions and materials may be used), includes front hooks 34a and 34b and snaps 36a and 36b positioned on the rear portions of the sides. The seating platform 30 is also preferably molded from plastic, but other constructions and materials may be used.

Figure 2:
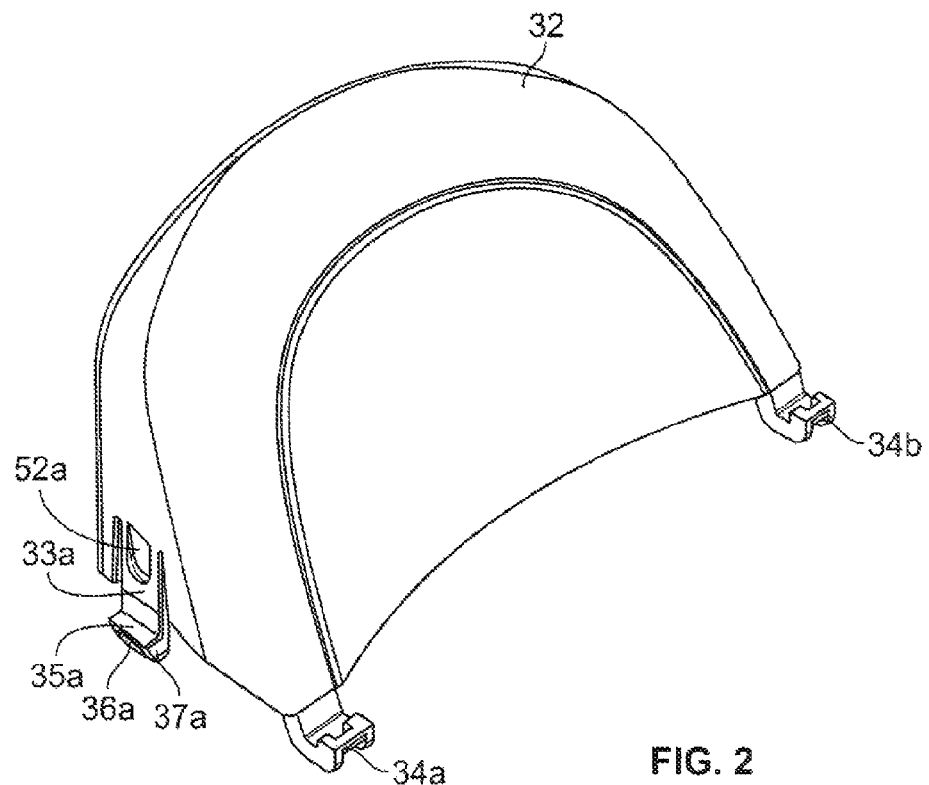
FIG. 2 is a perspective view of the seatback of the tricycle of FIG. 1.
Figure 5:
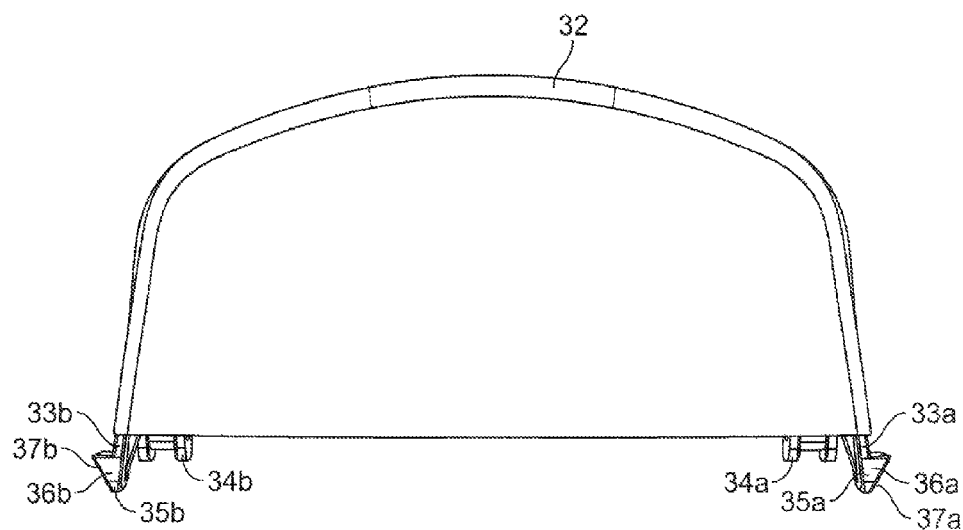
FIG. 5 is a rear elevational view of the seatback of FIG. 2.
Figure 6:
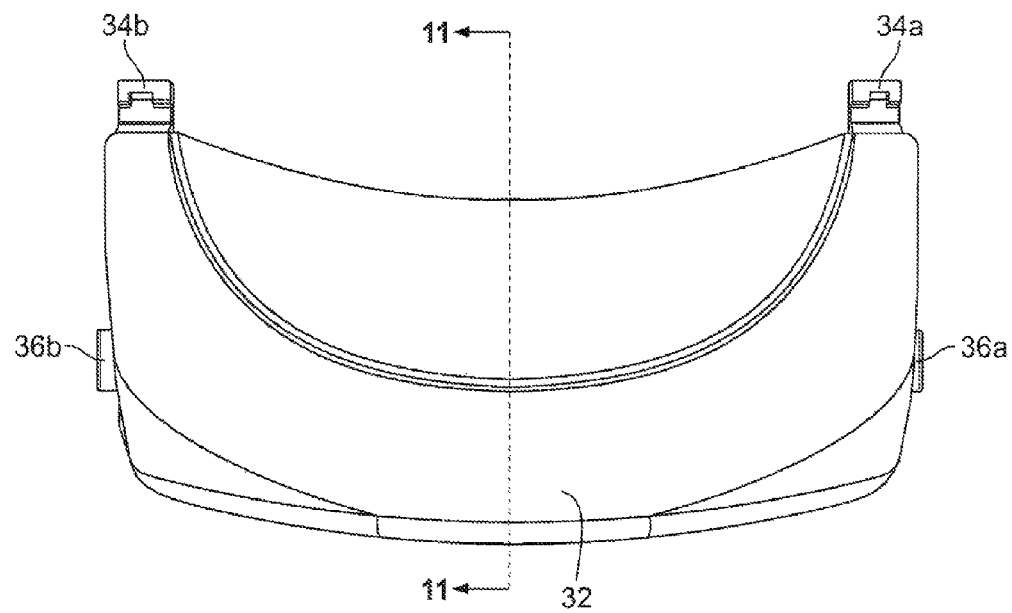
FIG. 6 is a top plan view of the seatback of FIG. 2.
Figure 7:
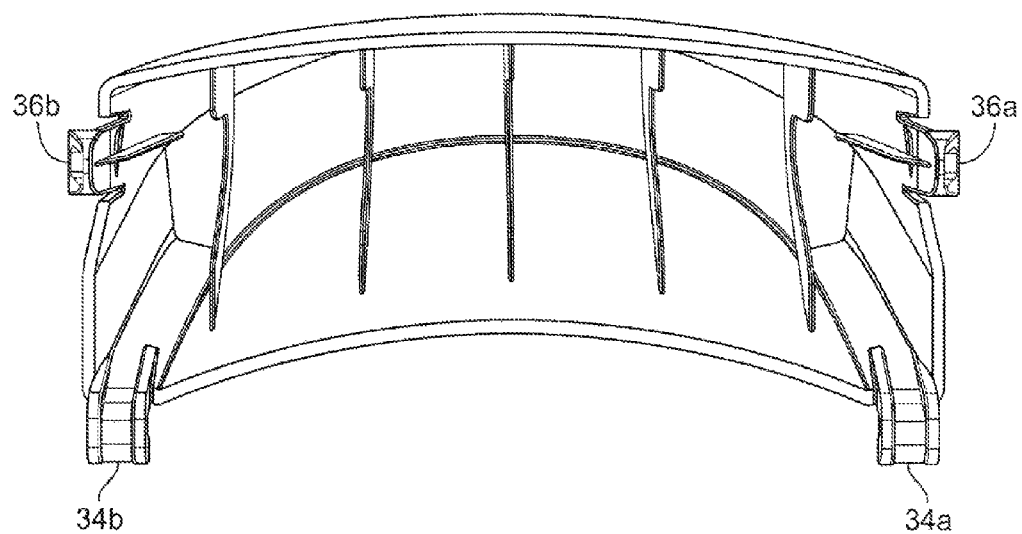
FIG. 7 is a bottom plan view of the seatback of FIG. 2.

Snaps 36a and 36b are resiliently positioned in the configuration illustrated in FIGS. 2-7. More specifically, as best shown in FIGS. 2 and 5, the snaps 36a and 36b each feature a tongue portion 33a and 33b and a catch portion 35a and 35b. Catch portions 35a and 35b each preferably include an inclined engagement surface 37a and 37b which facilitates insertion of the catch portions 35a and 35b into holes in the seating platform as explained below.

As illustrated in FIGS. 8A-14B, the seating platform 30 of the tricycle is provided with four pairs of seat mounting holes: 40a, 40b; 42a, 42b; 44a, 44b and 46a, 46b. Of course an alternative number of seat mounting holes may be provided.

Figure 8A:
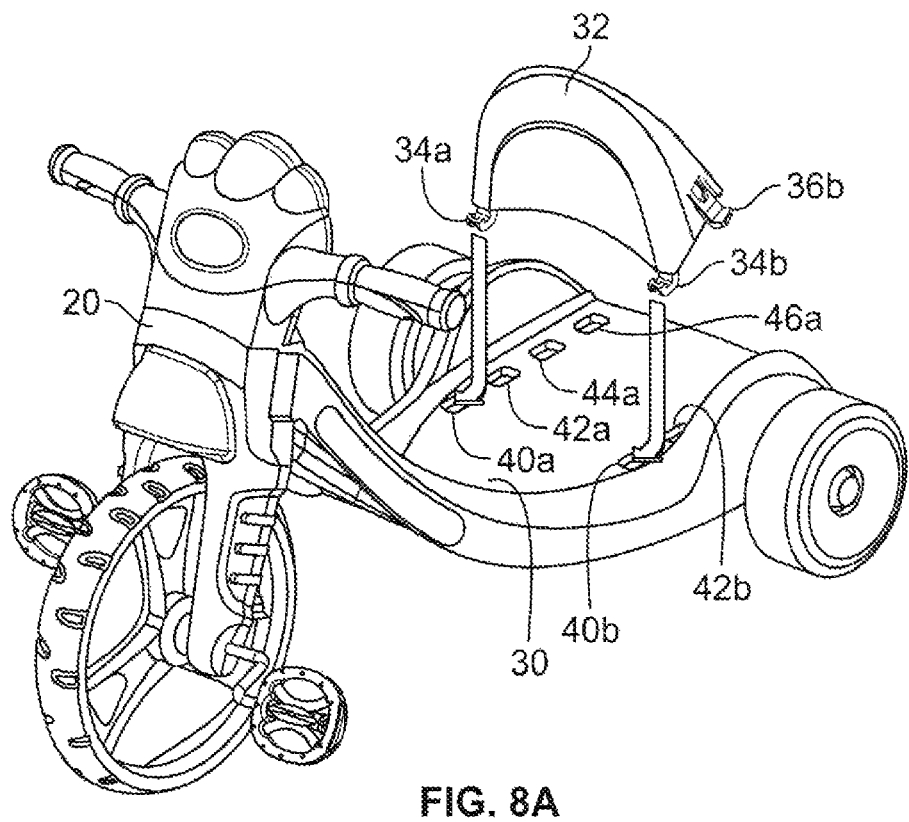
FIGS. 8A and 8B are perspective views of the tricycle of FIG. 1 illustrating installation of the seatback of FIGS. 2-7 in a front position.
Figure 8B:
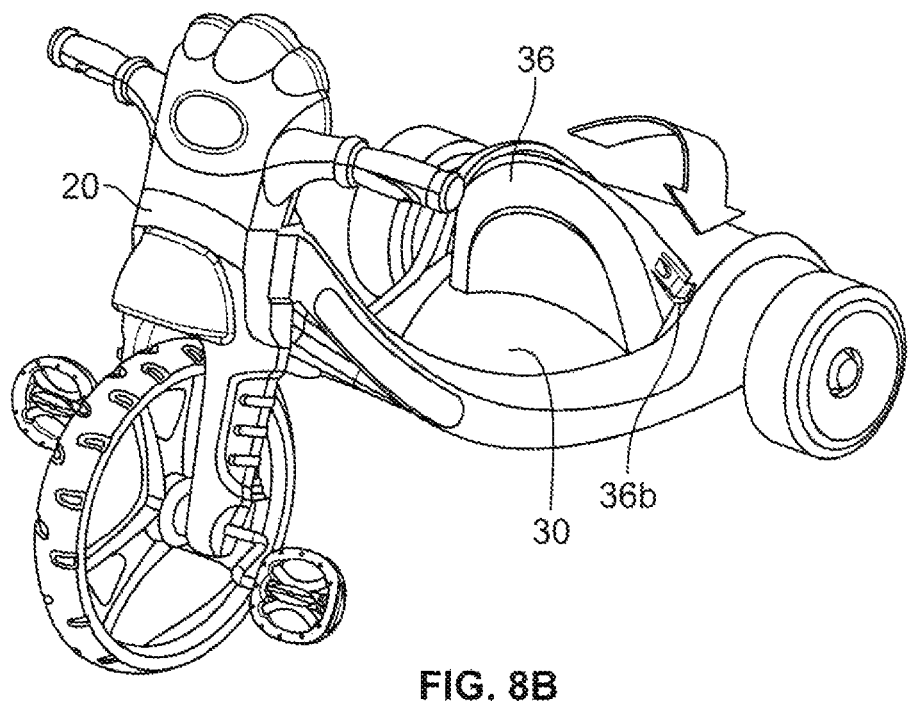
Figure 9:
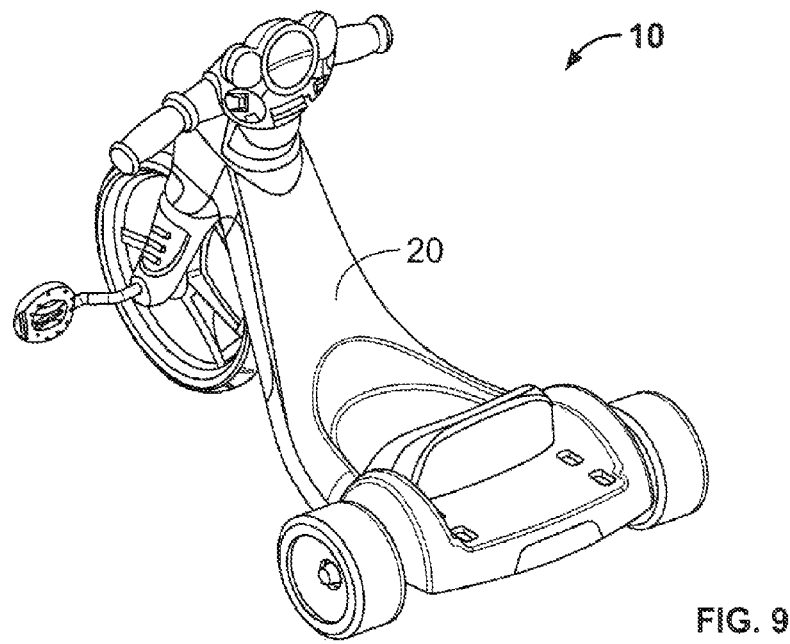
FIG. 9 is a partial rear perspective view of the tricycle of FIGS. 1 and 8B.
Figure 10:
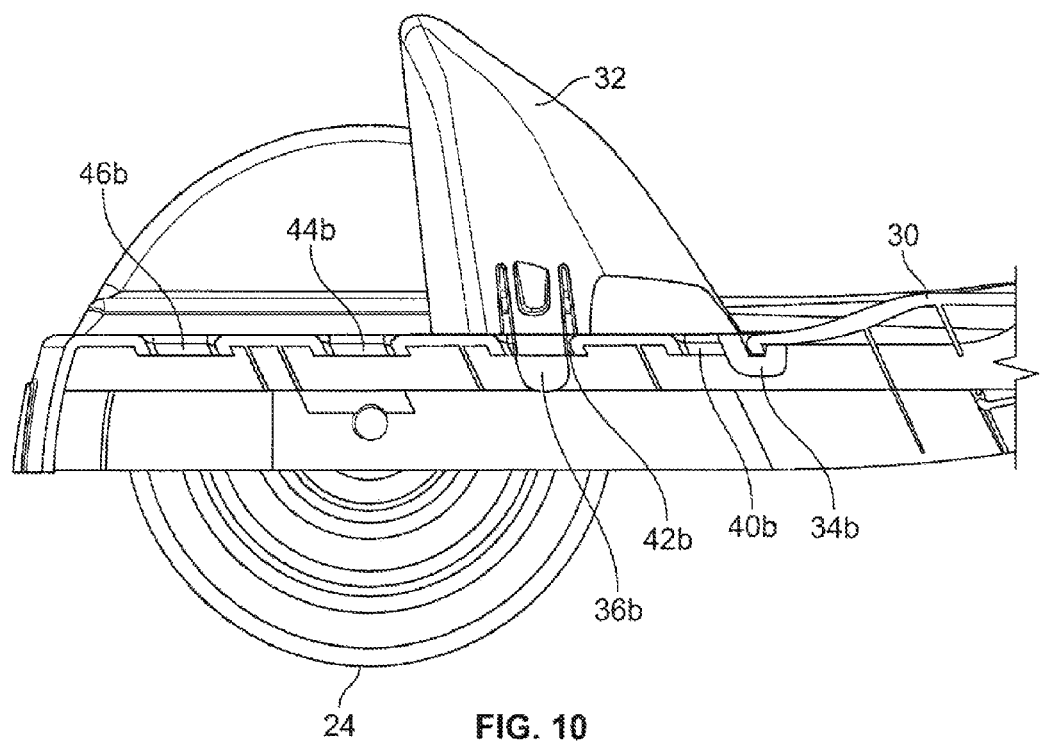
FIG. 10 is a cross sectional view of the rear portion of the tricycle taken along plane 10 of FIG. 9.
Figure 12A:
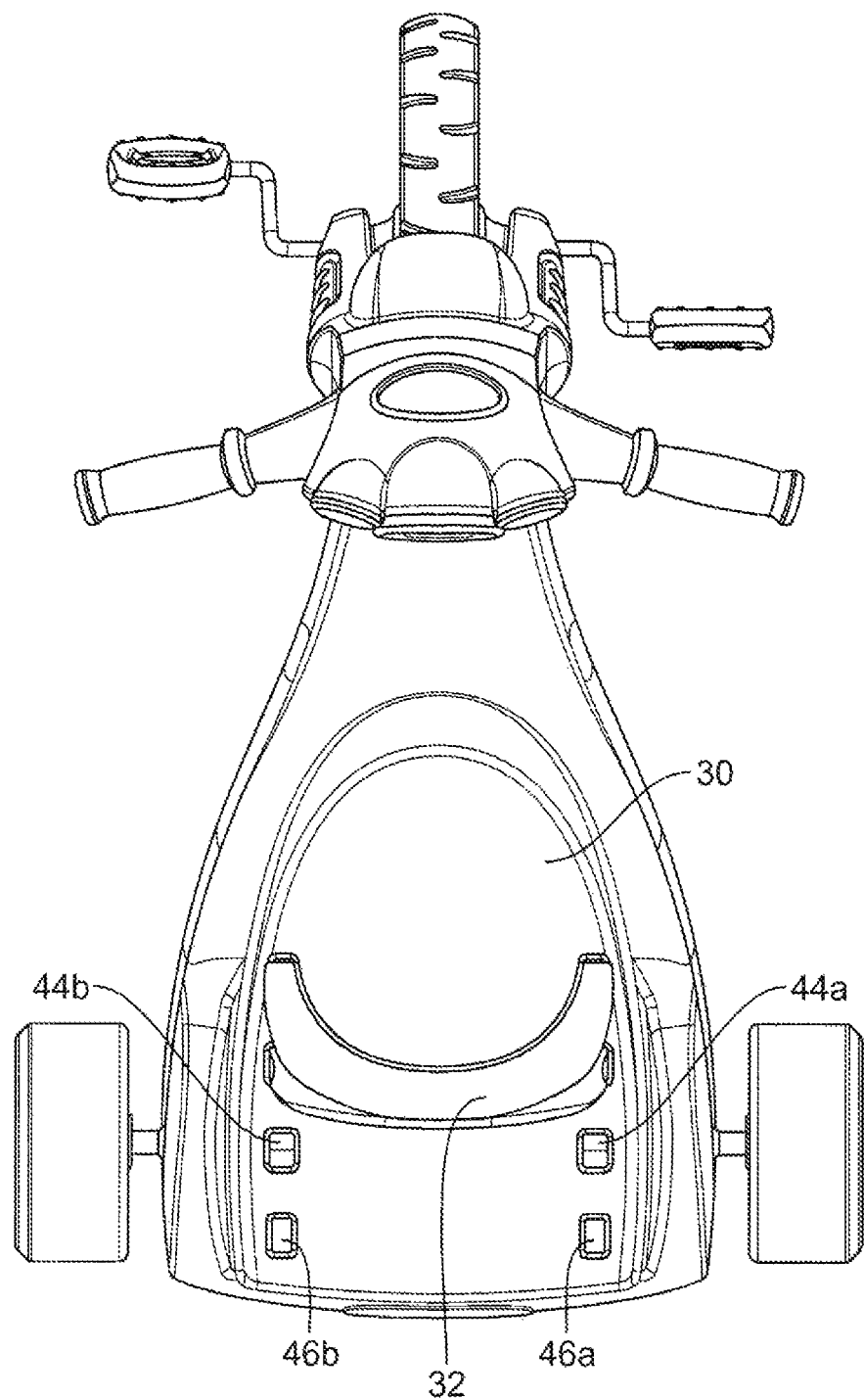
FIGS. 12A and 12B are top and partial bottom plan views, respectively, of the tricycle of FIG. 1 showing the seatback of FIGS. 2-7 installed in the front position.
Figure 12B:
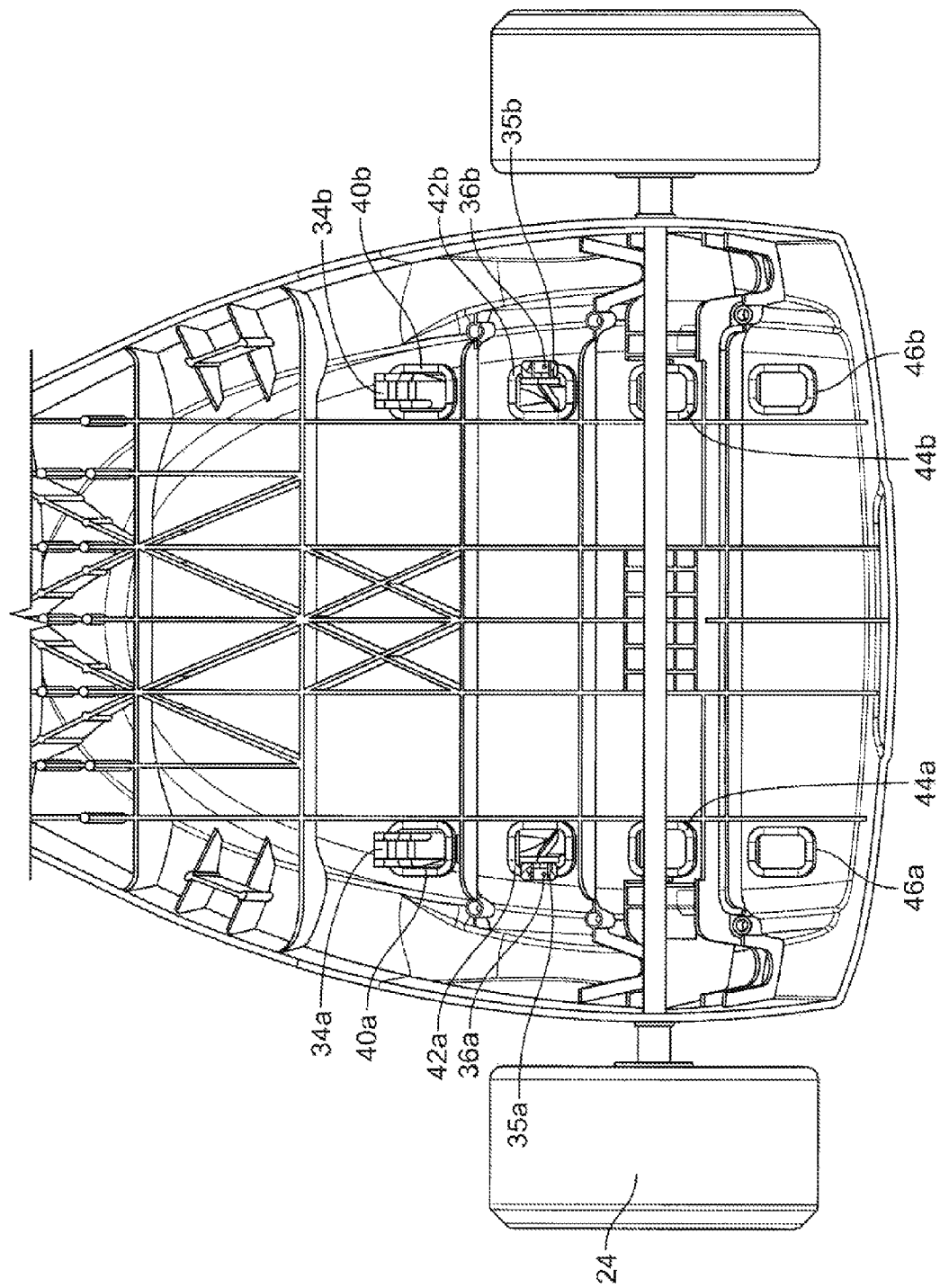

With reference to FIGS. 8A and 8B, the seatback 32 is installed on the seating platform 30 in the front position by inserting hook 34a into hole 40a and hook 34b into hole 40b. Snaps 36a and 36b then snap into engagement with holes 42a and 42b, respectively, as shown in FIGS. 8B and 10. More specifically, the inclined engagement surfaces (37a and 37b of FIGS. 2 and 5) of the snaps 36a and 36b engage the outer edges of holes 42a and 42b and the tongue portions (33a and 33b of FIGS. 2 and 5) flex as the catch portions (35a and 35b) of the snaps travel into the holes and then snap into the positions shown in FIG. 12b to lock the seatback in place. The seatback secured in the front position (top and bottom views) is shown in FIGS. 12A and 12B as well.

Figure 3:
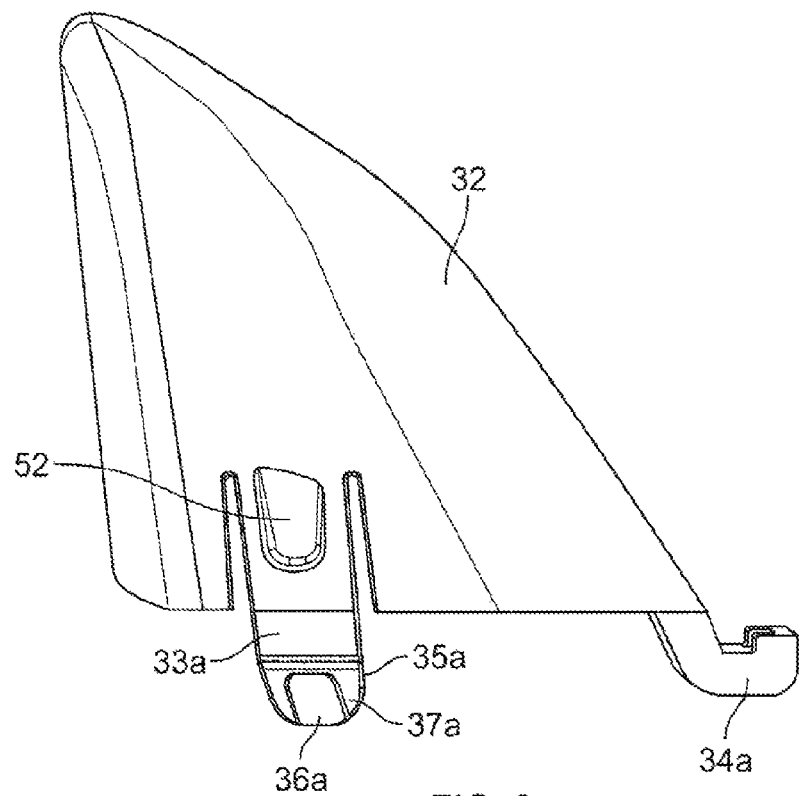
FIG. 3 is a side elevational view of the seatback of FIG. 2.
Figure 4:
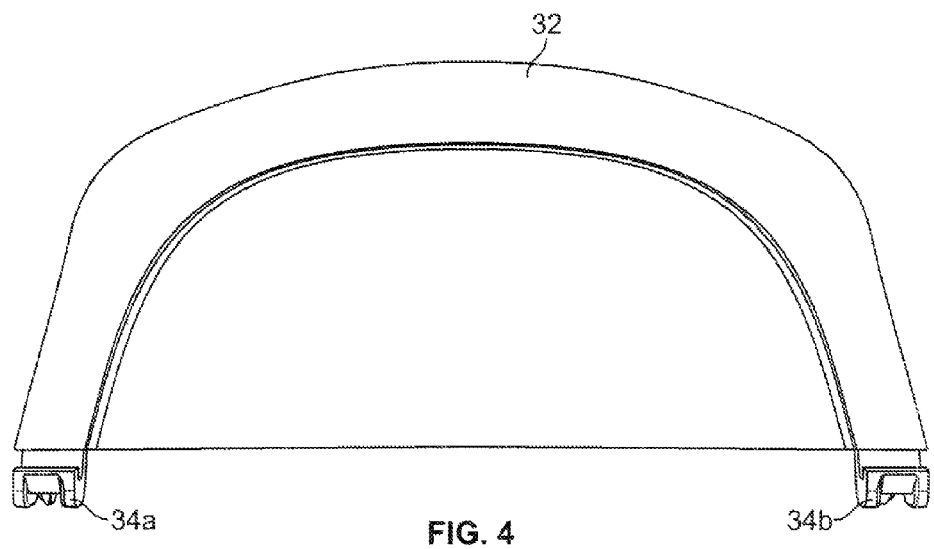
FIG. 4 is a front elevational view of the seatback of FIG. 2.

With reference to FIG. 2, snap 36a may be removed from hole 42a by pushing button 52a, which is positioned on tongue 33a and shown in FIGS. 2 and 3, so that the catch portions (35a and 35b in FIGS. 2 and 5) of the snaps 36a and 36b clear the edges of the corresponding holes, and lifting up on the seat. Tongue 33b of snap 36b features a similar button that is pushed simultaneously with button 52a to permit removal from hole 42b. The rear portion of the seat may then be lifted and the hooks 34a and 34b removed from holes 40a and 40b (the reverse of FIGS. 8A and 8B).

In summary, the seatback is installed by inserting the hooks into the desired seat mounting holes and then pivoting the snaps down into the rearward neighboring holes so that they engage the rims of these holes. The seat is removed by depressing the sides of the snaps and pivoting the seatback upwards.

Figure 13A:
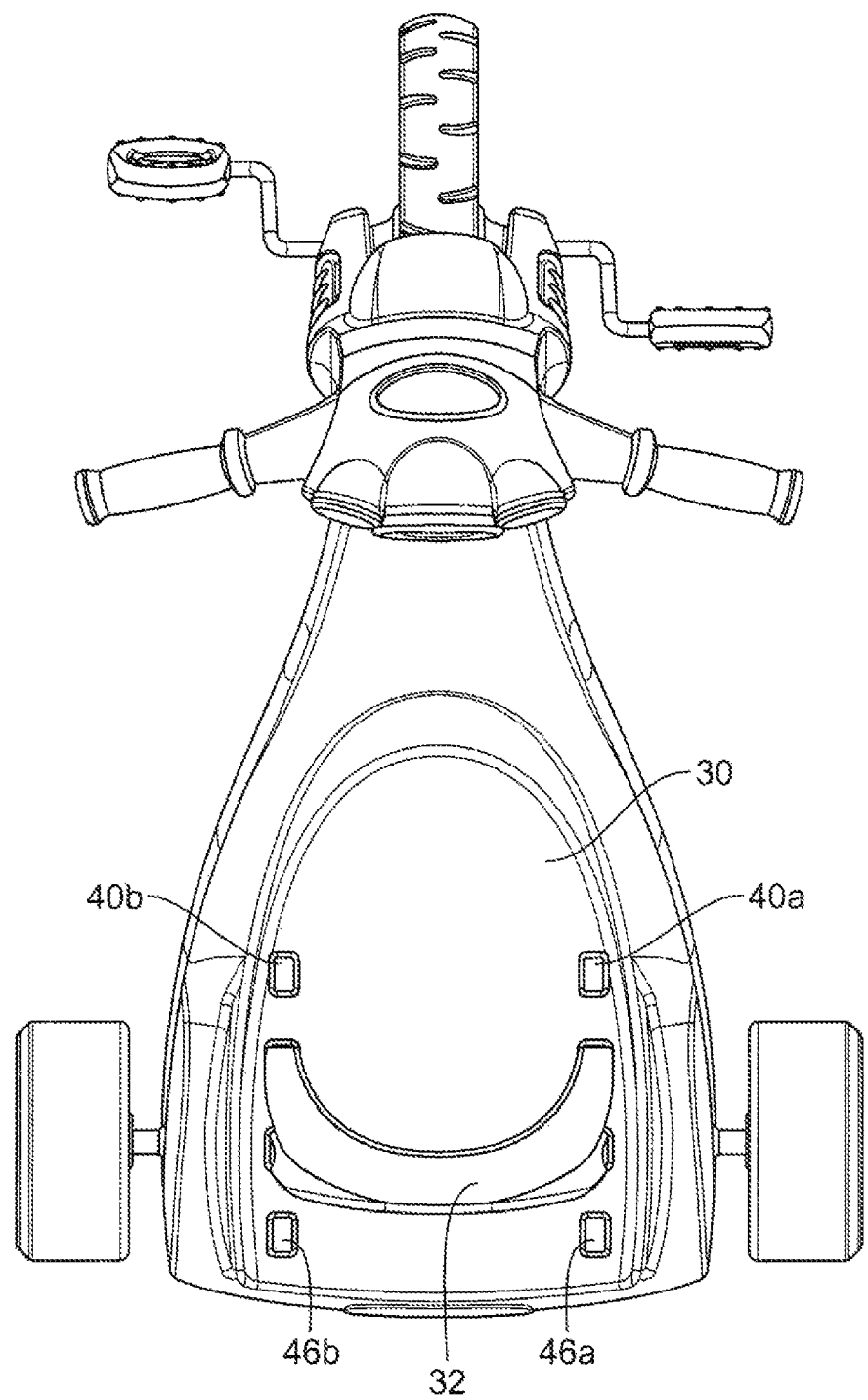
FIGS. 13A and 13B are top and partial bottom plan views, respectively, of the tricycle of FIG. 1 showing the seatback of FIGS. 2-7 installed in the middle position.
Figure 13B:
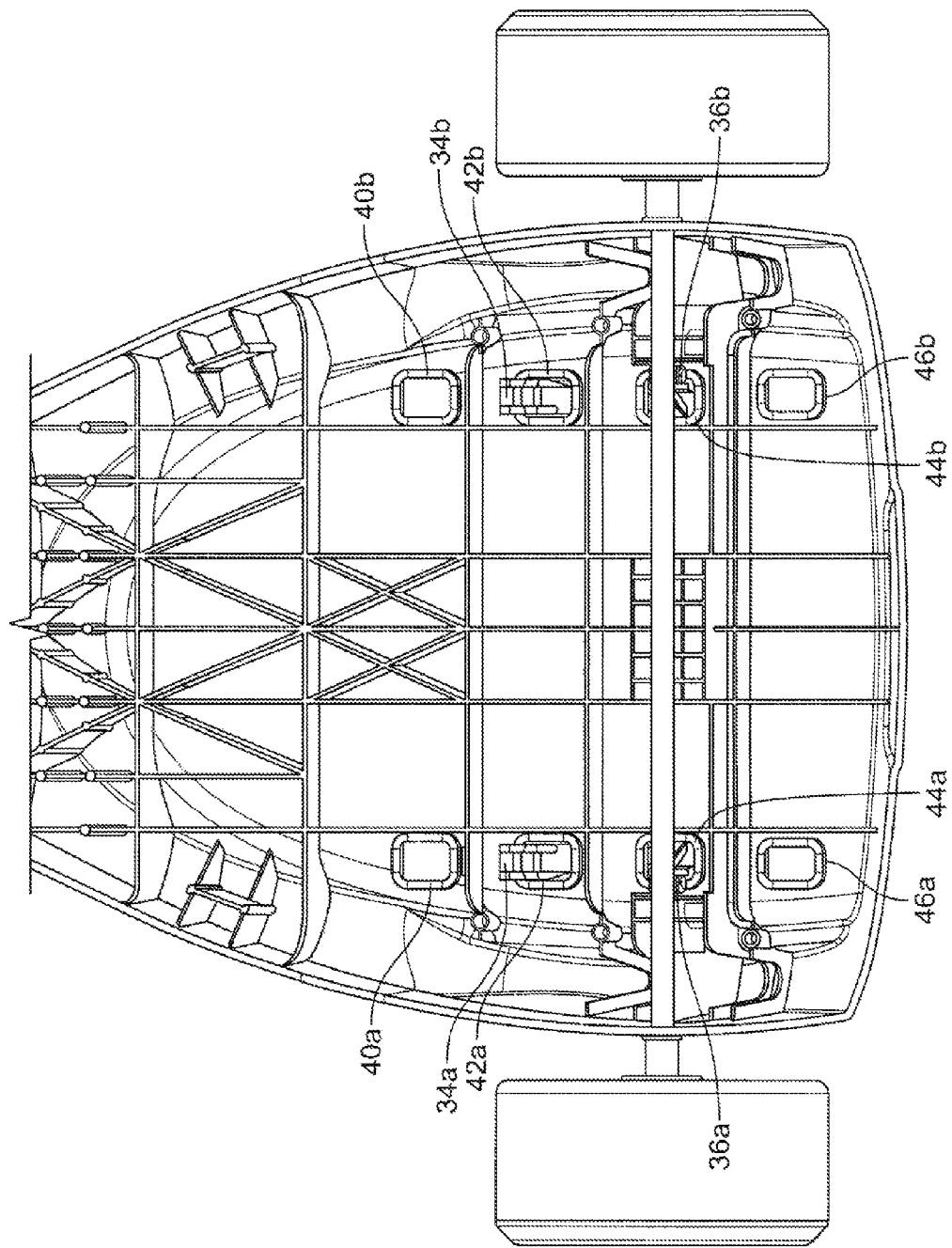

Top and bottom views of the seatback 32 installed in the middle position are illustrated in FIGS. 13A and 13B.

Figure 14A:
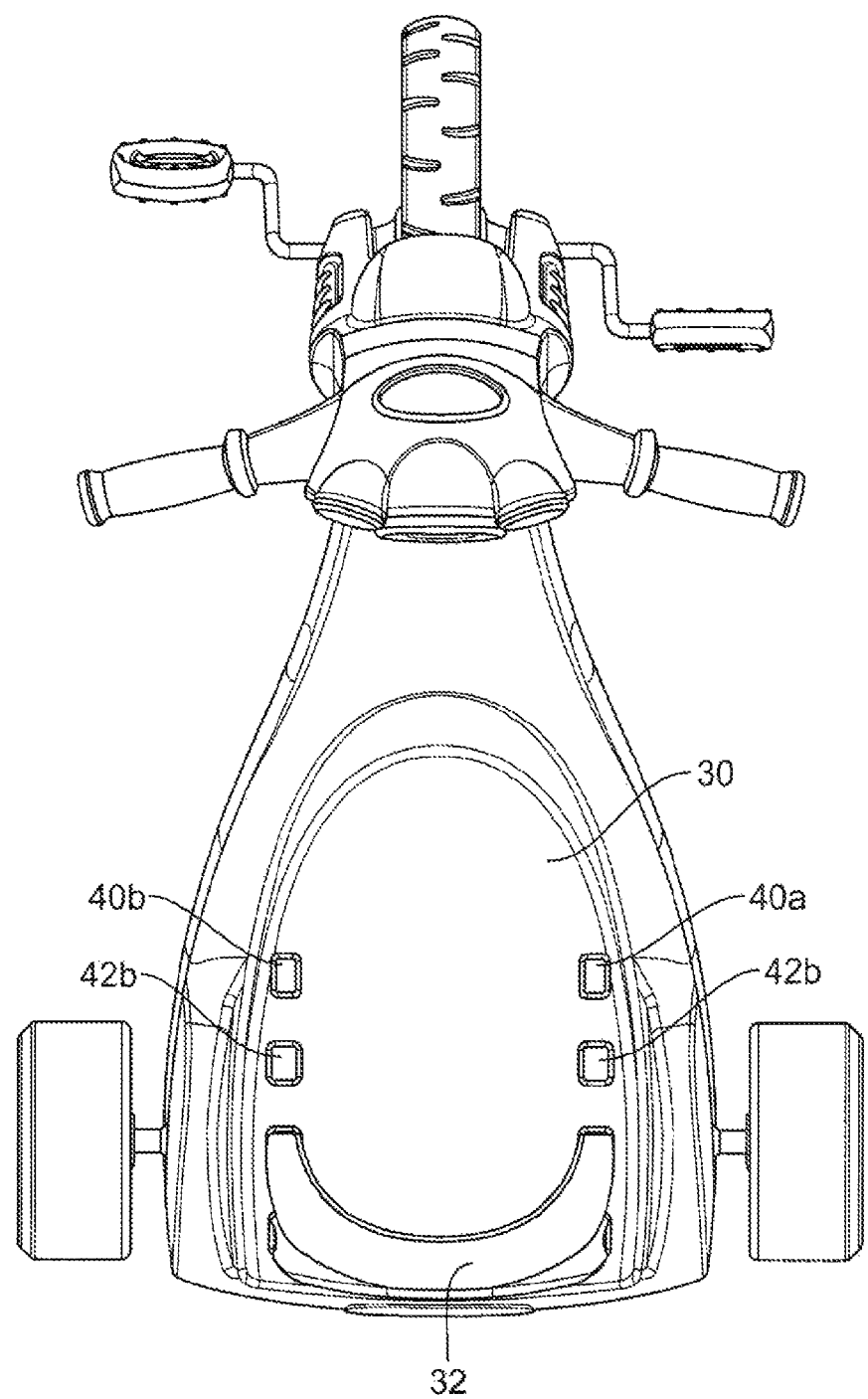
FIGS. 14A and 14B are top and partial bottom plan views, respectively, of the tricycle of FIG. 1 showing the seatback of FIGS. 2-7 installed in the rear position.
Figure 14B:
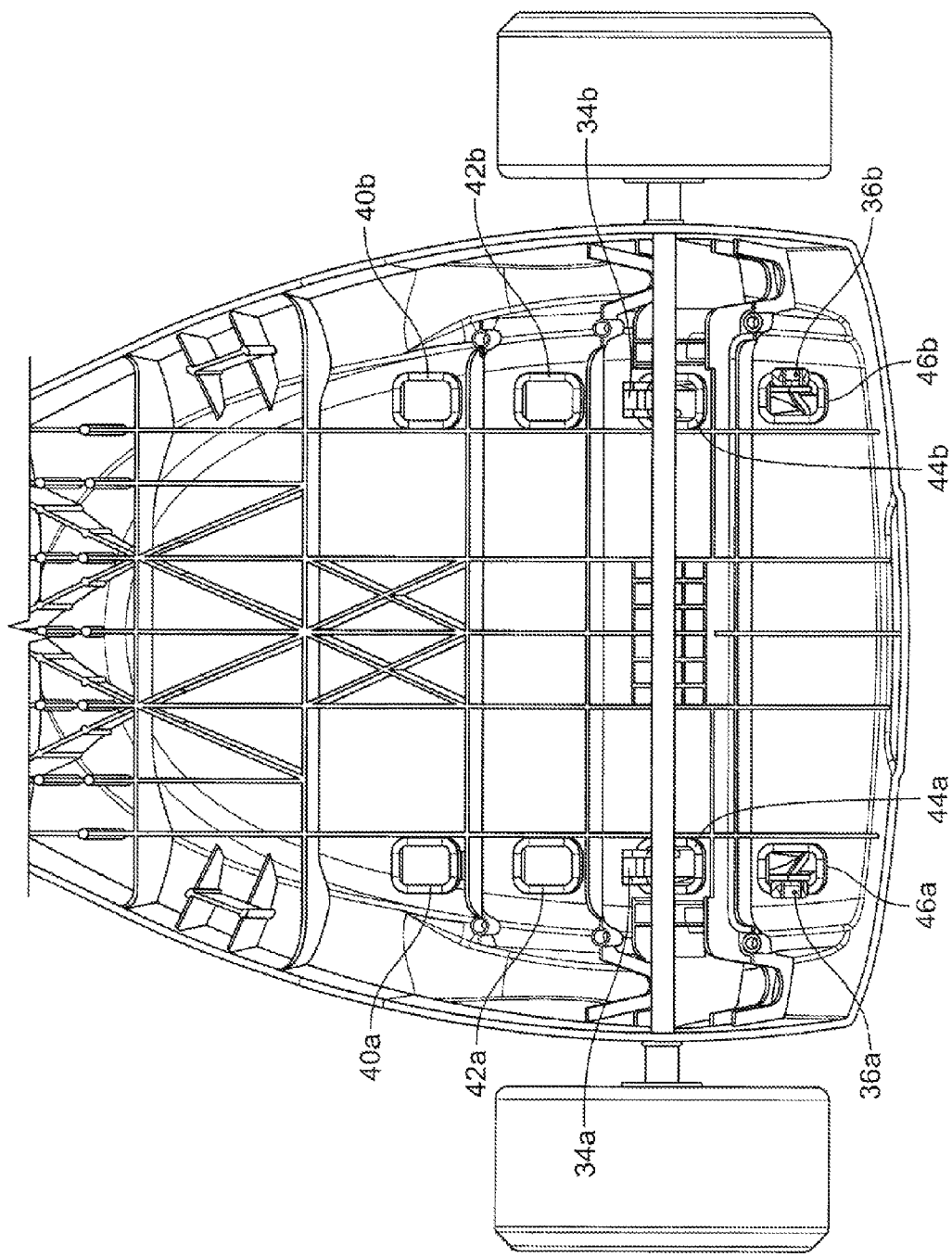

Top and bottom views of the seatback 32 installed in the rear position are illustrated in FIGS. 14A and 14B.

Figure 11:
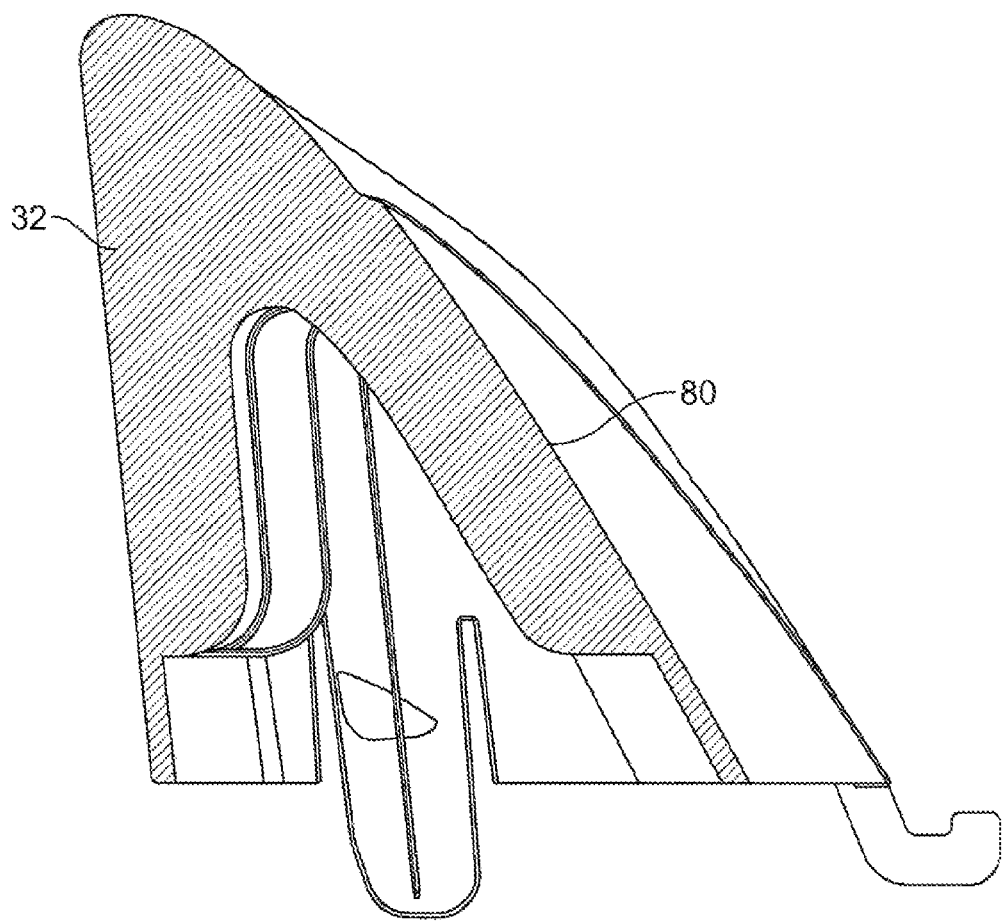
FIG. 11 is a cross sectional view of the seat of FIG. 6 taken along line 11-11.

With reference to FIG. 11, the seatback 32 preferably features a main inclined portion that makes an angle of approximately 32.5 degrees from vertical.

While the preferred embodiments of the invention have been shown and described, it will be apparent to those skilled in the art that changes and modifications may be made therein without departing from the spirit of the invention, the scope of which is defined by the appended claims.

What is claimed is:

1. A vehicle comprising:
    a. a seating platform featuring a first pair of seat mounting holes, a second pair of seat mounting holes positioned rearward of the first pair of seat mounting holes and a third pair of seat mounting holes positioned rearward of the second pair of seat mounting holes;
    b. a seatback;
    c. a pair of hooks mounted to a leading edge of the seatback;
    d. a pair of snaps attached to the seatback, each of said snaps including a tongue portion and a catch portion, wherein the catch portion is attached to the seatback by the tongue portion;
    e. said hooks and snaps adapted to engage the first and second pair of seat mounting holes to secure the seatback in a first position; and f. said hooks and snaps adapted to alternatively engage the second and third pair of seat mounting holes to secure the seatback in a second position.

2. The vehicle of claim 1 further comprising a fourth pair of seat mounting holes positioned rearward of the third pair of mounting holes and wherein said hooks and snaps are adapted to alternatively engage the third and fourth pair of seat mounting holds to secure the seatback in a third position.

3. The vehicle of claim 1 wherein the pair of snaps are mounted to opposing sides of the seatback.

4. The vehicle of claim 1 wherein each of the tongue portions includes a button that when pushed, releases a corresponding catch portion from a corresponding seat mounting hole.

5. The vehicle of claim 1 wherein each catch portion includes an inclined engagement surface.

6. The vehicle of claim 1 wherein each catch portion includes an inclined engagement surface.

7. The vehicle of claim 1 wherein the seatback includes an inclined portion that is at an angle of approximately 32.5 degrees from vertical.

8. The vehicle of claim 1 wherein the seatback and seating platform are constructed from molded plastic.

9. A tricycle comprising:
   a. a seating platform featuring a first pair of seat mounting holes, a second pair of seat mounting holes positioned rearward of the first pair of seat mounting holes and a third pair of seat mounting holes positioned rearward of the second pair of seat mounting holes;
   b. a front wheel;
   c. a pair of handle bars attached to the front wheel and pivotally attached to a front portion of the seating platform;
   d. a pair of rear wheels attached to a rear portion of the seating platform;
   e. a seatback;
   f. a pair of hooks mounted to a leading edge of the seatback;
   g. a pair of snaps attached to the seatback, each of said snaps including a tongue portion and a catch portion, wherein the catch portion is attached to the seatback by the tongue portion;
   h. said hooks and snaps adapted to engage the first and second pair of seat mounting holes to secure the seatback in a first position; and
   i. said hooks and snaps adapted to alternatively engage the second and third pair of seat mounting holes to secure the seatback in a second position.

10. The tricycle of claim 9 further comprising a fourth pair of seat mounting holes positioned rearward of the third pair of mounting holes and wherein said hooks and snaps are adapted to alternatively engage the third and fourth pair of seat mounting holds to secure the seatback in a third position.

11. The tricycle of claim 9 wherein the pair of snaps are mounted to opposing sides of the seatback.

12. The tricycle of claim 9 wherein each of the tongue portions includes a button that when pushed, releases a corresponding catch portion from a corresponding seat mounting hole.

13. The tricycle of claim 9 wherein each catch portion includes an inclined engagement surface.

14. The vehicle of claim 9 wherein each catch portion includes an inclined engagement surface.

15. The vehicle of claim 9 wherein the seatback includes an inclined portion that is at an angle of approximately 32.5 degrees from vertical.

16. The vehicle of claim 9 wherein the seatback and seating platform are constructed from molded plastic.

17. A vehicle comprising:
   a. a seating platform featuring a first pair of seat mounting holes, a second pair of seat mounting holes positioned rearward of the first pair of seat mounting holes and a third pair of seat mounting holes positioned rearward of the second pair of seat mounting holes;
   b. a seatback;
   c. a pair of hooks attached to the seatback;
   d. a pair of snaps attached directly to the seatback, each of said snaps including a catch portion;
   e. said hooks and snaps adapted to engage the first and second pair of seat mounting holes to secure the seatback in a first position; and
   f. said hooks and snaps adapted to alternatively engage the second and third pair of seat mounting holes to secure the seatback in a second position.

* * * * *